Sept. 24, 1968 W. E. HART ET AL 3,402,470
METHOD OF DETERMINING AN OBSERVER'S POSITION
BY USE OF A SATELLITE
Filed Oct. 22, 1965 4 Sheets-Sheet 1
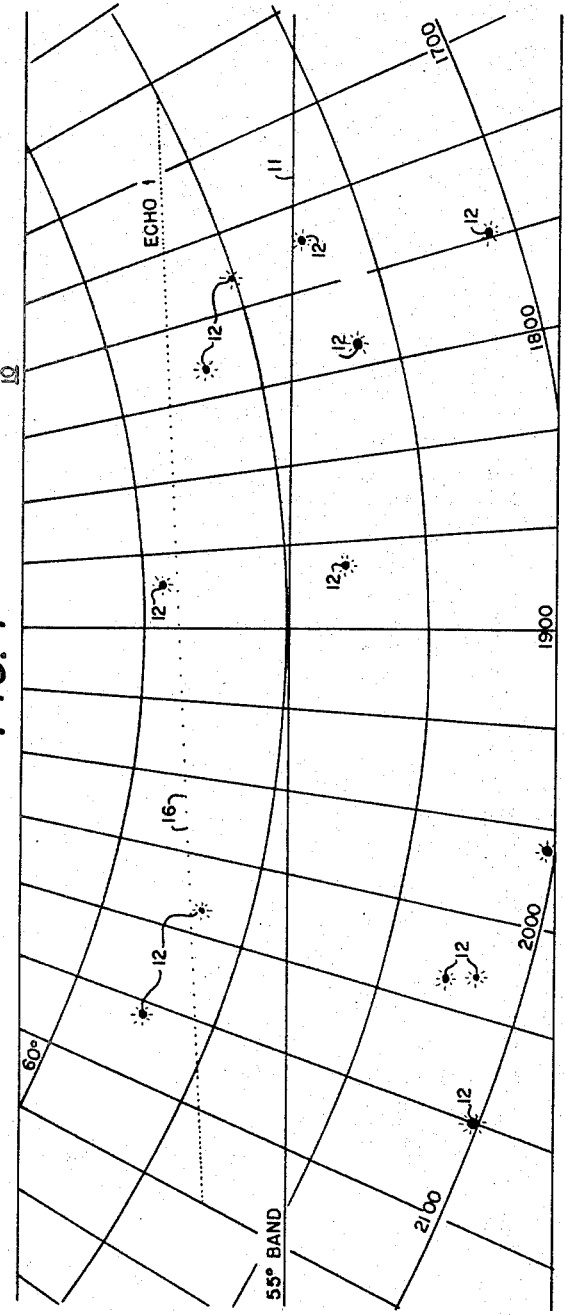
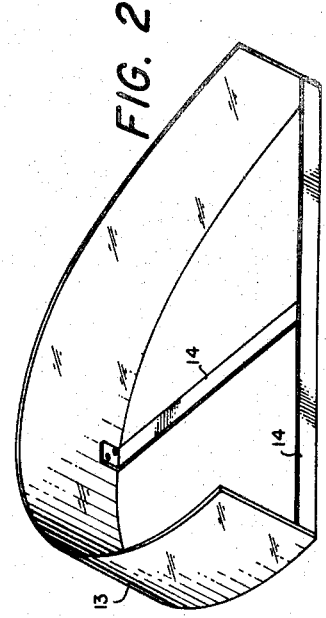
INVENTORS
WILLIAM E. HART
WILLIAM A. ALLEN
LESLIE L. CUNNINGHAM
BY *Melvin L. Crane* AGENT
*R. S. Sciascia* ATTORNEY

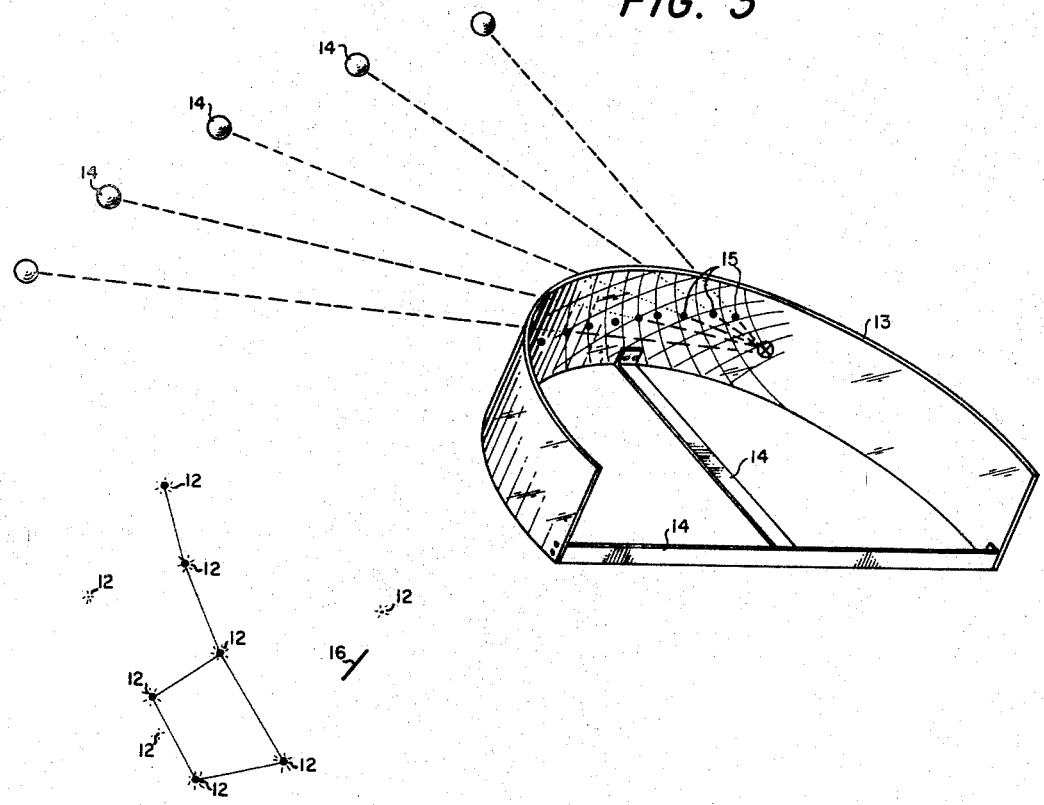

INVENTORS
WILLIAM E. HART
WILLIAM A. ALLEN
LESLIE L. CUNNINGHAM

United States Patent Office 3,402,470
Patented Sept. 24, 1968

3,402,470
METHOD OF DETERMINING AN OBSERVER'S POSITION BY USE OF A SATELLITE
William E. Hart, Berkshire, and William A. Allen, Clinton, Md., and Leslie L. Cunningham, Columbus, Ohio, assignors to the United States of America as represented by the Secretary of the Navy
Filed Oct. 22, 1965, Ser. No. 502,723
3 Claims. (Cl. 33—61)

ABSTRACT OF THE DISCLOSURE

A satellite is viewed through a transparent star-coordinate grid on which tracking reference stars are plotted. Observed satellite positions are plotted on the grid, and their times are recorded. From these data and the published coordinates of the satellite, the observer's position on earth is computed. The satellite path may be recorded photographically and projected onto the grid. A correctional vector may be obtained by comparing the results of the method as applied at land stations of accurately known position.

The invention described herein may be manufactured and used by or for the Government of the United States of America for governmental purposes without the payment of any royalties thereon or therefor.

The present invention relates to a position indicator system and more particularly to a method of determining the location of an observer on the earth's surface through the use of observations of orbiting earth satellites and by reference to the stars of the celestial sphere.

Heretofore expensive equipment has been used to determine the positions for navigational and/or geodetic purposes through the use of orbiting satellites. Such equipment may be of a radiometric system which makes use of Doppler, radiometric ranging, or angular measuring systems. These systems depend on electronic equipment on the ground as well as within the satellite. Thus, any failure of the ground equipment, or satellite equipment including electronic components as well as batteries, makes the satellite and system a useless object and/or system in determining a desired position. Other equipment such as photogrammetric or optical systems depend upon expensive and delicately balanced ballistic cameras and therefore aboard ship a stabilized platform system, which aboard ship requires gyrostabilization. Thus, either of the former systems requires complex equipment which is not only costly but subject to failure of the many components that make up the systems. It is well recognized that any failure of the components aboard the satellite brings about a complete failure in the operation of this system since there is not a chance for repair or recovery of the equipment of the satellite.

The method of the present invention is carried out by use of a simple, inexpensive, hand-held device through which the satellite path and stars are observed and indicated onto a grid surface of the hand-held device. The hand-held device is a section of a transparent Gnomonic, Oblique Mercator, or similar projection of the right ascension and declination grid system. Hereinafter the phrase Mercator projection will serve to represent any and all suitable projections which can be used for this purpose. The center line of the template and projection is made tangent to the satellite predicted great circle path. Stars a few degrees either side of and along the predicted satellite path are plotted on the grid. The template is constructed in such a way that the observer needs only to orient the device for observing the satellite's path. This is done by superimposing the stars on the template with the actual stars in the heavens. The template is held in place and orientation maintained in any of a variety of modifications of the basic handheld device. In this manner, similar to use of the handheld sextant, the observer becomes the stabilized platform for the observing instrument.

It is therefore an object of the present invention to provide a relatively inexpensive method for determining one's position on the earth's surface through observation of visible earth satellites.

Another object is to provide a method of determining position by use of earth satellites which does not depend on an electrical output from the satellites.

Still another object is to provide a method of determining one's position on the earth which is not dependent upon actual star identification.

Another object is to provide a method of determining position on a ship as well as ashore.

Another object is to provide a satellite shipboard positioning system which does not require an expensive stabilized platform.

Another object is to eliminate the necessity for extreme precision in recording each satellite's observed position and to eliminate the need for recording extremely precise time for each observation and thereby eliminate the need for the associated precise and expensive measuring and timing equipment.

The nature of this invention as well as other objects and advantages thereof will be readily apparent from consideration of the following specification relating to the annexed drawings, in which:

FIG. 1 illustrates an Oblique Mercator projection grid of a certain area of the sky including specific stars used as a reference for tracking a satellite;

FIG. 2 illustrates a side view of the device used to carry out the method of the present invention using the grid shown in FIG. 1;

FIG. 3 illustrates the instrument in use to observe and record the track of an earth's satellite;

FIG. 5 represents a photo of a satellite in orbit relative to the Big Dipper.

FIG. 7 is a triangular representation of the vertices of the earth's geocenter, the observer and the satellite.

Figure 4:
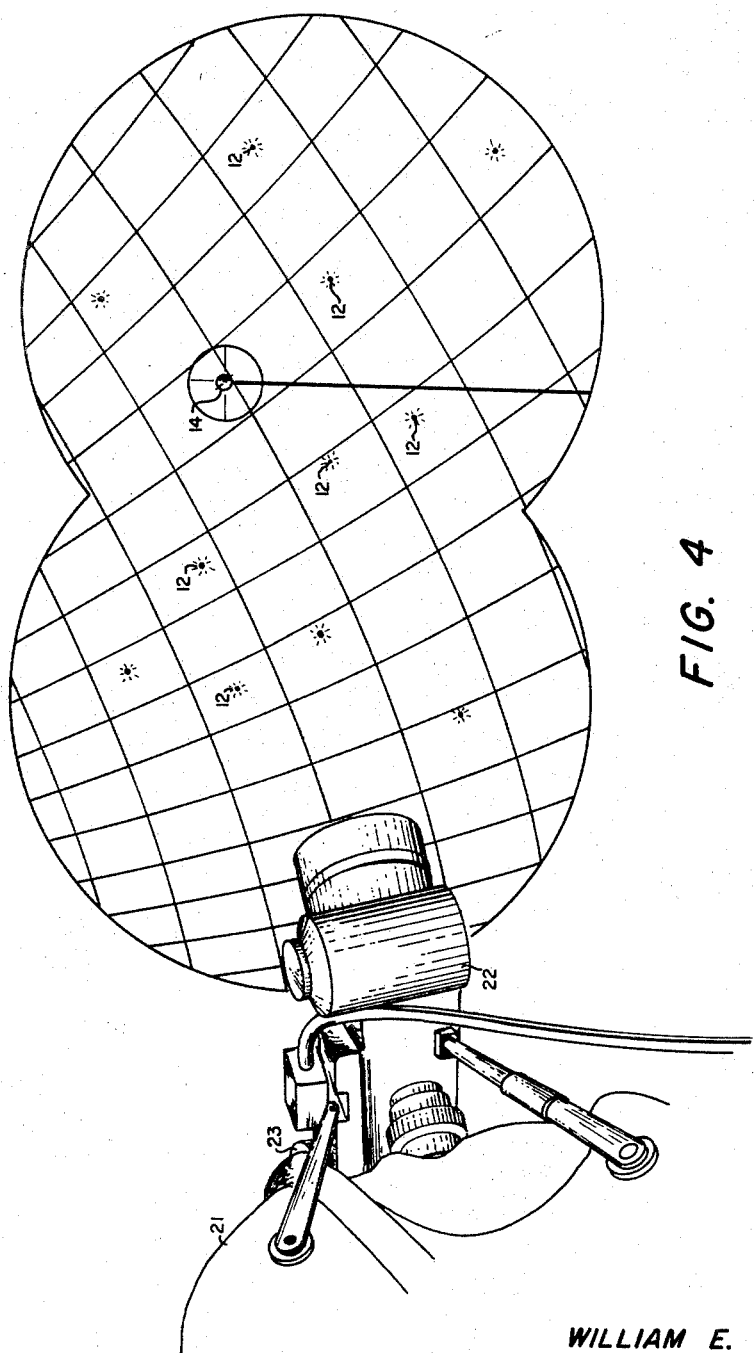
FIG. 4 illustrates a modification of the device to provide automatic computation of position by use of a computer.

Now, referring to the drawings, there is shown by illustration instrumentation for carrying out the present invention. FIG. 1 represents a transparent Oblique Mercator projection 10 of the right ascension and declination grid of a particular sectional area of the sky. The center line 11 of the projection is made tangent to the satellite's predicted great circle path and stars 12 a few degrees on either side of and along the predicted satellite path are plotted onto the grid.

FIG. 2 illustrates a device 13 upon which the projection is secured for observing a satellite in orbit and recording the track of the satellite. The device is made of a flat surface, clear plastic or some other suitable transparent material through which one may observe a satellite. The device is a section of a cylinder shaped into an arc or a semi-circular piece and held in the proper shape by use of suitable lightweight bars or brackets 14 of metal or other suitable relatively lightweight material having sufficient rigidity to maintain the device in a semi-circular shape. The device must have sufficient width to provide a support for the Mercator projection grid. The support brackets are secured to the device in any convenient manner so that the brackets will not interfere with securing the Mercator projection grid thereon or interfere with the line of sight of an observer.

FIG. 3 illustrates the use of the device 13 to track a satellite 14 from which the position of the observer may be obtained. Since the sky background of stars is different as seen from different parts on the earth, an Oblique Mercator projection grid must be made for each of the many different sections of the sky so that the stars represented on the grid may be matched with the stars in the sky background by which the satellite will pass. The device is aligned with the star background and as the satellite passes, the satellite's apparent positions 15 are observed and recorded simultaneously on the grid. Also, the actual time of each recording of each of the observances is recorded. Thus, anyone desiring to determine their position on earth, may observe a satellite, record the path 16 on Mercator or other suitable projection grid, and record the time of each observance.

The satellite's track 16 will be a smooth curve approximating a straight line and as many observations as possible should be recorded during one pass of the satellite. If the observations are few in number and spaced, the observer may draw a smooth line connecting the recorded points. From the recorded times of the actual observations that are plotted, the observer may fit a time scale to the whole newly plotted and adjusted smooth curve. Right ascension and declination values are then scaled off the grid for all observation points. The observer may use any time interval for scaling. Since a satellite pass from horizon to horizon is about 15 to 20 minutes, at maximum, a scaling time interval of 15 seconds will provide 60 to 80 data points. The device is constructed in such a manner that actual star identification is not needed and as illustrated above only a few actual observations are actually required since positions may be filled in on the grid.

The satellite track may be obtained by use of a camera as well as individual personal sightings. The camera used in obtaining a picture of the satellite's track must be a fast speed camera such that definite positions of the satellite can be determined. After the satellite's track has been taken on film, the film is developed and the negatives are put into an enlarging projector. The film image is then projected onto a Mercator or other suitable projection grid in which the Mercator projection grid has the star arrangement of the area in which the pictures were taken. The image stars on the photographs are oriented with the stars on the grid and then the satellite image from the oriented film image is traced directly onto the Mercator projection grid. If necessary adjustment in scaling of the satellite track may be carried out as described above.

Obviously the Mercator projection grid type recording may be used with other systems wherein a more sophisticated system is as follows:

The Mercator projection grid may be miniaturized, placed in a photomultiplier or magnifying lens system and mounted in a headset 21. As shown in FIG. 4, the headset allows an observer maximum freedom of movement and offers the best conditions for stabilization and gimbaling. The image seen through the headset allows orientation by superimposition of the star grid on the actual stars in the same manner as with the hand-held device. A scribe, pointer, floating dot of light, etc., may be used and controlled by hand to trace the satellite path directly onto the template. The movement of the pointer may be traced and recorded by a mechanical or electrically linked and driven graphic plotter. The scribe or point of movement also may be digitized so that it provides direct input to a synchronously operating computer, which, after receiving all observation input data, will compute and print out the final position solution. Since separate grids are needed for different areas of the sky, the headset may include a magazine-type feed 22 and takeup 23. The magazine will contain a continuous strip of successive grids in which a manual or small power-driven mechanism will feed the grids from the magazine past the observer's eyes until the proper pattern of star background appears before the observer.

Another use for which the Mercator projection grid may be put to use is for the purpose of navigation of manned space capsules. Different Mercator projection grids with the stars outlined thereon may be made to fit and be oriented to the windows of a space capsule. For any, or any number of preselected points along a predicted path, the Mercator projection grids with the star background thereon may be prepared for the precomputed star patterns that would be visible for a capsule on a correct course. If at the precomputed time, the astronaut observed that the pattern did not line up as predicted, the amount of translation and/or rotation necessary to bring the Mercator projection grid and actual stars into a position of superimposition, may be converted directly to capsule attitude control thrust values. First, an astronaut may follow a planned predicted line of travel in space by use of the stars' background on a Mercator projection grid such as disclosed above.

In making use of the device of the present invention, observations are made at night when a satellite illuminated by reflected sunlight can be seen against a star background. An observer is required to record timed positions of the satellite, relative to the star background as many times as possible, during one pass of the satellite across the horizon. In order to make the observations and record the satellite line of travel, a transparent Oblique Mercator projection of the right ascension and declination grid with the proper star background must be used. The stars of the grid are matched with the stars in the sky and then the observed path of the satellite is indicated on the grid simultaneously with the recording of the time of the recorded observation. In determining the actual position of an observer by use of the orbiting satellite path, information must be known of the position in latitude and longitude as well as the altitude of the satellite. This information is readily available on the major satellites orbited by the United States through the National Aeronautics and Space Administration. Thus by having readily available information such as the ephemerides of satellite position predictions and orbit parameters available from NASA or other Government agencies such information may be used to determine the position of an observer. Since the observer has orbital parameter information as well as the ephemeris list, at one-minute intervals (GMT), the satellite predicted subpoint position in latitude and longitude and its altitude above the ellipse, in this form may be readily converted to right ascension and declination for the exact instant of time of each observation.

Figure 6:
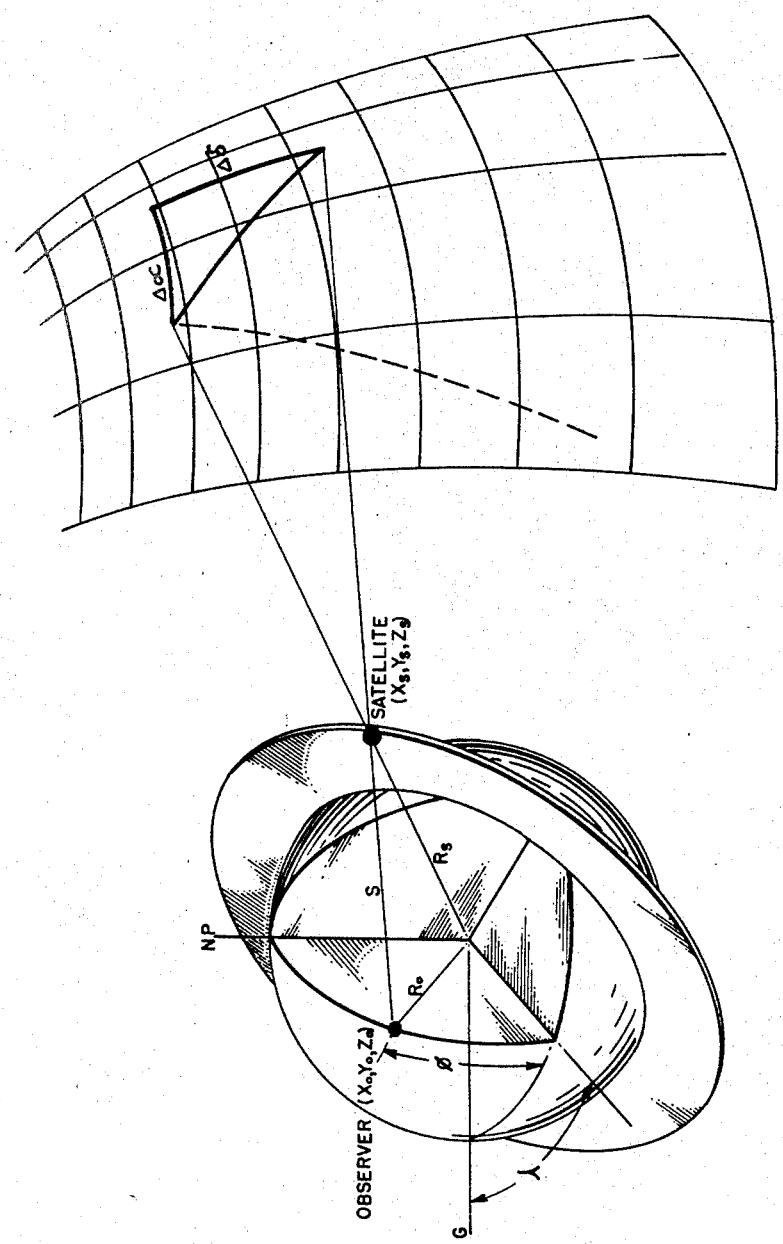
FIG. 6 is a diagrammatic representation of the observer's position and the earth's geocentric position relative to an observed satellite.

It is a known fact that for any given instant of time there does exist a difference between the geocentric position and the observed position of the satellite (FIG. 6) which allows computation of the observer's position. In terms of a triaxial (XYZ) coordinate system with origin at the earth's center and by use of trigonometry, formulas have been derived for the basic triangle, FIG. 7, the vertices of which, are the earth's goecenter, the satellite and the observer's position. From known orbital parameters, the satellite's predicted X, Y, Z coordinates are known. The predicted geocenter to satellite distance is known (orbital radius of satellite for time of observation). The direction of the line from the satellite's apparent position to the observer is determined by the observation. Each observation produces two equations with three unknowns. Therefore, every two observations will produce a unique solution for the observer's position. A Least Squares solution of all observation equations will produce the most reliable mean position of the observer. The precision of the position thus determined is dependent primarily on observational errors and precision of orbital data. Error in the computed position of the observer, due to error in predicted orbital data, can be readily corrected and will be explained later in this specification.

It can be seen that the present invention is conceptually simple and a relatively inexpensive method and system for satellite marine navigation and geodesy.

FIG. 7 represents a basic triangle by which the observers position, $X_o Y_o Z_o$, is determined. The observed data obtained through satellite observations is as follows:
 (a) Time of observation (GMT).
 (b) Satellite apparent right ascension ($\alpha'$) and
 (c) Satellite apparent declination ($\delta'$).

The known orbital data as obtained from the ephemerides of satellite predictions is as follows:
 (a) Satellite right ascension ($\alpha$).
 (b) Satellite declination ($\delta$).
 (c) Satellite geocentric radius (R).

The observed data and known data are inputs for any one observation for a solution by the method of Least Squares. The observation equations which relate the known, observed and unknown data are as follows:

$$X_o \sin G' + Y_o \cos G' = R \cos \delta \sin (\alpha' - \alpha) \quad (1)$$

$$X_o \cos G' - Y_o \sin G' - Z_o \cot \delta'$$
$$= R[\cos \delta \cos (\alpha' - \alpha) - \sin \delta \cot \delta'] \quad (2)$$

where:

$$G' = \alpha' - \gamma$$

$\gamma$ = the hour angle of the vernal equinox with respect to the Greenwich Meridian.

$R$ = the geocentric satellite radius for the instant of observation (usually in decimal multiples of *one* earth radius).

The observer's position determined by the above method is not sufficiently accurate for certain requirements due to errors in predicted satellite orbital data; therefore, a more accurate determination may be made by use of the position obtained by the above method and then interpolation by the following method.

It is well known that the position of land base stations, such as on the mainland and on islands have been determined accurately by high cost precision equipment. Therefore an observer at these stations knows the exact location of the station. Thus, the position of a base station is determined by computation of observational data by the method of the present invention and compared with the known position of that station. The error vector (distance and direction) is attributed directly to the effects of errors in predicted satellite orbital positions, in fact, the same error vector exists for any station conducting simultaneous observations. Therefore it can be assumed that the computed position of the unknown station position has been affected similarly. It can be concluded, therefore, that applying the known base station error vector in reverse, as a correctional factor, to the computed position of all observing stations, including the observer's computed position will result in their true position.

Simultaneous observations from the unknown station and the known base station are not necessary. It is a simple matter to locate base stations so that the base stations track the satellite on opposite sides of the unknown observer's station and make corrections information obtained by the base stations. Single base station observations made on successive orbits which span the time of observation in the unknown observer's area will serve the same purpose. By either of the latter two methods, the error vector (correctional vector) at the base stations may be interpolated for the error value at the time of the observation at the observer station's unknown position. Thus an observer's position may be accurately determined by knowing the time position of other stations and determining the error vector, if any, determined by satellite observation position determination at the base station.

What is claimed is:

1. A method for determining an observer's position on earth particularly at sea by observation of an orbiting satellite, which comprises:
 matching stars plotted onto a transparent projection of the right ascension and declination grid with the stars in the sky,
 observing a satellite's path across the sky relative to the matched star background,
 plotting the observed apparent position of the satellite's path onto the transparent grid,
 recording the time of each observation simultaneously with plotting of each observed apparent position of said satellite relative to the star background,
 determining the right ascension and declination values for each plotted position of the satellite,
 obtaining the X, Y, Z coordinates of the satellite from a satellite ephemeris,
 recording the geocenter to satellite distance, and
 from the information obtained and known, determining the observers position on earth by use of the simultaneous Equations 1 and 2 set forth heretofore in the specification.

2. A method as claimed in claim 1, which comprises:
 obtaining an observer's position at separate known positions and at an unknown position to be determined by use of said orbiting satellite,
 comparing the obtained positions with the known positions,
 determining an error vector between the time positions of the known positions and the position determined by use of said orbiting satellite,
 correcting the determined position of said unknown position by use of the correction vectors of each of said known stations.

3. A method for determining an observer's position on earth by observation of an orbiting satellite as claimed in claim 1, which comprises:
 photographing the path of an orbiting satellite against a background of stars,
 developing the film used for photographing the satellite's path,
 projecting the image of the developed film onto said transparent right ascension and declination grid,
 aligning the star background image from the film with the star plot on the grid, and
 plotting the satellite path onto said grid.

References Cited

UNITED STATES PATENTS

| 2,205,357 | 6/1940  | Hagner | 33—61 |
| 2,372,487 | 3/1945  | Hagner | 35—43 |
| 3,002,278 | 10/1961 | Weems  | 33—61 |

ROBERT B. HULL, *Primary Examiner.*